Oct. 19, 1943.  C. W. SHAW  2,332,270
KEY FOR PINNING GEARS TO SHAFTS
Filed April 17, 1942
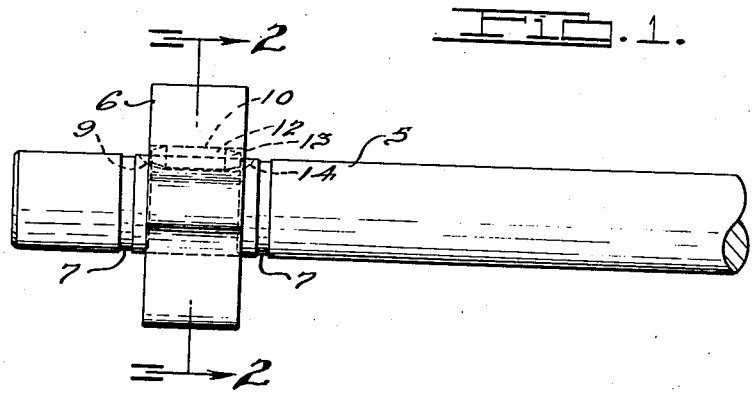
FIG. 1.
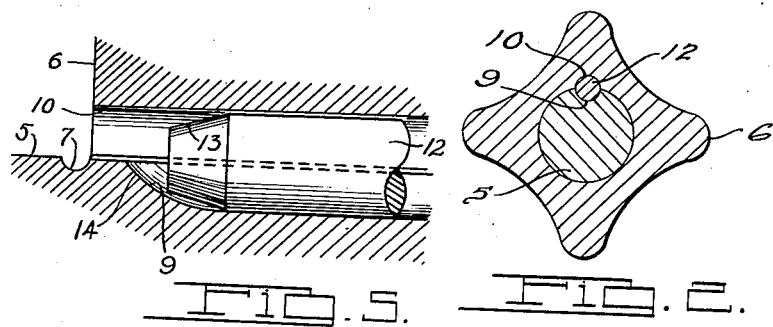
FIG. 5.   FIG. 2.
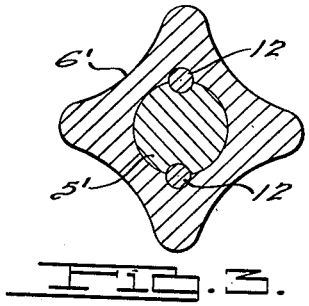   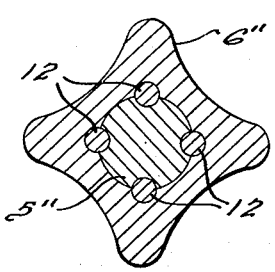
FIG. 3.   FIG. 4.
INVENTOR
Clarence W. Shaw.
BY John F. Stark
ATTORNEY Patented Oct. 19, 1943

2,332,270

UNITED STATES PATENT OFFICE 2,332,270

KEY FOR PINNING GEARS TO SHAFTS

Clarence W. Shaw, Grosse Pointe Woods, Mich., assignor to Eaton Manufacturing Company, Cleveland, Ohio, a corporation of Ohio Application April 17, 1942, Serial No. 439,321

3 Claims. (Cl. 287—52.05)

This invention relates to keys and keyways in general, and, more particularly, concerns a novel key construction for non-rotatably mounting an object on a shaft.

Heretofore numerous keys and keyways have been devised for fastening gears, pulleys, and the like, to a rotatable shaft on which they may be mounted. The most common and well known key is the Woodruff which is simply a generally semi-circular disc of various radii and thickness dependent upon the shaft diameter upon which it is to be used. Other conventional key forms are the square, square and flat, and the plain taper key, each of which has the individual cross section enumerated and is elongated in length. Still further types of keys comprise the cylindrical key which is tapered in its longitudinal dimension and is known as the Nordberg key; and a similar form of key with a so-called Gib-head. Keys are generally proportioned with relation to the shaft diameter, instead of considering the torsional load in each case, because of practical reasons, such as standardization and interchangeability.

In so far as applicant is aware, the present novel straight cylindrical key has never been used before, and was conceived by him after repeated breakage of a conventional Woodruff key. It will be understood the spline drive is much more satisfactory than a key drive because it is lighter for the same strength and provides a greater spline-bearing area with smaller stress concentrations. However, the spline drive is not susceptible of being accurately ground to provide a concentric bearing surface to the part to be received and generally one of various key-type drives, as aforementioned, have been employed. Accordingly, the present key construction for stress concentrations and strength closely approaches a spline drive and in some cases exceeds the spline, accommodates concentrically ground bearing surfaces, and affords a floating rotor mounting for a shaft which may be passed through bushings and has other advantages to be described.

Among the objects of the present invention is the provision in a driven shaft having an object mounted thereon, of means to non-rotatably fix the same thereto which comprises a straight cylindrical key affording low concentration of stresses imposed thereon by the driven shaft; the provision in a key drive, as described, of a straight cylindrical key with its axially opposite ends having tapered edges to prevent wedging in the key-seat and destructive transverse concentrations of stress in the shaft; the provision in a shaft having a semi-circular recess in its outer periphery to reduce stress concentrations and a gear or pulley mounted thereover with an opposite complementary shaped semi-circular recess, of means including a straight cylindrical key to secure the parts together for rotation in unison; the provision on a rotated shaft of driving means comprising one or more pairs of straight cylindrical keys disposed in recesses at opposite ends of a diameter of said shaft.

Further and other objects and advantages of the present invention reside in the novel combination and arrangement of parts about to be described, when taken together with the drawing forming a part of this specification, and which are more particularly pointed out in the appended claims.

In the drawing similar reference characters denote corresponding parts in the several views, and in which:

Fig. 1 is a side-elevational view of a rotatable shaft with a gear pinned thereto by a preferred form of key means according to the teaching of this invention; and Fig. 2 is a vertical sectional view of the shaft and gear keyed thereto taken on the line 2—2 of Fig. 1; and Fig. 3 is a vertical sectional view similar to Fig. 2 illustrating a pair of diametrically opposed key-driving means; and Fig. 4 is another vertical sectional view but illustrating a further modified form of cylindrical key-driving means including two pairs of keys disposed at opposite ends of diameters of the shaft.

Fig. 5 is a vertical sectional view through a portion of the driving and driven parts at greatly enlarged scale to reveal the disposition of the key therebetween.

Now having reference to the drawing and particularly Figs. 1 and 2, there is shown a rotatable shaft 5, with a toothed rotor 6 mounted thereon, and having peripheral recesses 7 in the shaft at opposite sides thereof which receive snap rings, not shown, to prevent axial displacement along the shaft. In the outer periphery of the shaft 5 is milled, or otherwise cut, a semi-circular keyway 9, and a complementary shaped keyway 10 is broached through the toothed rotor 6 from face to face and the two keyways are rotated until one overlies the other to form a cylindrical chamber therebetween. In the chamber thus formed is received a straight cylindrical key 12 whose surfaces are parallel for the major portion of its length but have oppositely disposed tapering portions 13 adjacent each end thereof to prevent wedging or cocking of the key in the adjacent rounded end portion 14 of keyway 9 in the shaft, as best shown in Fig. 5. The diameter of the key 12 is arranged to be received freely but snugly in the semi-circular keyway 9 so that the overlying semi-circular keyway 10 in the periphery of the centrally apertured rotor 6 may have a sliding fit thereover. Thereafter snap rings, not shown, are locked in the recesses 7 and the rotor is thus non-rotatably keyed to the shaft and prevented from axial movement away from its key along the shaft.

In Figs. 3 and 4 vertical sectional views of a similar rotor 6' and 6" are shown mounted upon a shaft 5' and 5", respectively, but in these instances are comprised of one and two pairs of cylindrical keys 12 having parallel surfaces and which are disposed at opposite ends of one or more diameters of the shafts and disposed equally spaced about the periphery thereof. This multiplication of the key driving means, shown by way of example, may be employed where conditions of service or use necessitate greater torsional loads and for reasons of smaller concentrations of stress, and greater bearing areas, are divided up or spaced about the shaft periphery.

It will now be apparent that due to the rounded or curved surfaces formed in the shaft and rotor faces and the cylindrical surface of the key contacting the same that stress concentrations in each of the embodiments shown is reduced to a minimum, and by reason of the parallel surfaces on the straight cylindrical key it is possible to slide the rotor freely on or off the shaft. This is to be distinguished from a tapered cylindrical key which is fitted tightly into a complementary shaped tapered pocket and necessitates removal in one direction and then only after the parts have been forcibly separated. Furthermore, the tapered outer ends 13 of the keys 12 are provided to prevent the cylindrical portion of the key from jamming or wedging on the radius 14 at the termination of the keyway 9 which would produce a destructive stress between the rotor and shaft members, as best shown in Fig. 5. With a key-seat construction as disclosed there are no sharp corners as a result of the machining operations on the shaft which would provide points for stress concentrations and materially reduce the shaft strength. It will be understood, of course, the invention is not limited to securing the particular rotor shown to a rotated shaft but may be employed equally as well with other forms of gears or pulleys desired to be likewise secured.

From the foregoing disclosures it will be apparent there has been described a novel key structure embodying, among other things, the objects and advantages of the invention first enumerated. It is not intended, however, to be limited to specific examples shown, which are merely by way of illustration, as many modifications will now be suggested to those skilled in the art to which it is related and the spirit and substance of the broad invention is commensurate with the scope of the following claims.

What I claim is:

1. A drive for a rotatable shaft having a part mounted thereon to be rotated therewith and including an elongated keyway of semi-circular cross-section terminated in axially opposed arcuate end portions, a semi-circular keyway formed axially through the mounted part and the said keyways defining a cylindrical key-seat therebetween, said drive consisting of a cylindrical key with parallel sides confined in the shaft keyway and slidable in the mounted part keyway to non-rotatably lock the members together, and said key having its axially opposed edges tapered at and adjacent the ends thereof whereby jamming or wedging and incipient points of stress concentration in the terminal arcuate end portions of the shaft keyway are prevented.

2. In a drive for non-rotatably mounting a driven part with respect to a driving part, a keyway of semi-circular cross-section extended axially through the driven part, a second keyway of semi-circular cross-section with terminal end portions tapered to the surface of the driving part and disposed oppositely to said first keyway to define in conjunction therewith a key-seat therebetween, said drive consisting of a cylindrical key with parallel sides confined in said driving part and slidable in said driven part keyway, and said key terminated in axially opposed edges of reduced cross-section at and adjacent the ends thereof whereby in conjunction with the keyway in the driven part and the sliding fit therewith longitudinal movement may be effected between the driven and driving parts.

3. A key-drive for non-rotatably mounting a driven part with respect to a driving part, elongated keyways semi-circular in cross section disposed axially in the driving and driven parts to define a cylindrical key-seat therebetween, said elongated keyway in the driving part having a uniform depth throughout the major portion of its length and terminated in arcuate end portions tapered to the surface of the driving part, said key-drive consisting of a cylindrical key with parallel sides and having terminal end portions of substantially reduced cross-section arranged to contact the tapered arcuate end portions of the driving part keyway at substantially a medial distance between the surface of the driving part and the major uniform depth of the keyway whereby the ends of the parallel sides of the major portion of the key are prevented from exerting a wedging action on the major uniform depth of the driving part keyway.

CLARENCE W. SHAW.